(12) United States Patent
Monnig et al.

(10) Patent No.: US 12,335,276 B2
(45) Date of Patent: Jun. 17, 2025

(54) EXPONENTIALLY SMOOTHED CATEGORICAL ENCODING TO CONTROL ACCESS TO A NETWORK RESOURCE

(71) Applicant: Kount Inc., Boise, ID (US)

(72) Inventors: Nathan Daniel Monnig, Boise, ID (US); Andrew Nader Rafla, Boise, ID (US); Samuel Ward Schrader, Boise, ID (US)

(73) Assignee: KOUNT INC., Boise, ID (US)

( * ) Notice: Subject to any disclaimer, the term of this patent is extended or adjusted under 35 U.S.C. 154(b) by 252 days.

(21) Appl. No.: 17/646,696

(22) Filed: Dec. 31, 2021

(65) Prior Publication Data

US 2023/0216866 A1  Jul. 6, 2023

(51) Int. Cl.
*H04L 9/40* (2022.01)

(52) U.S. Cl.
CPC ........ *H04L 63/1416* (2013.01); *H04L 63/102* (2013.01); *H04L 63/1425* (2013.01); *H04L 63/1466* (2013.01); *H04L 63/20* (2013.01)

(58) Field of Classification Search
CPC . H04L 63/1416; H04L 63/1425; H04L 63/20; H04L 63/10; H04L 63/102; H04L 63/1466; H04L 2463/102; G06N 20/00
See application file for complete search history.

(56) References Cited

U.S. PATENT DOCUMENTS

| | | | |
|---|---|---|---|
| 2005/0262556 A1* | 11/2005 | Waisman | H04L 63/1408 726/22 |
| 2015/0195299 A1* | 7/2015 | Zoldi | H04L 63/1408 726/25 |
| 2015/0319185 A1* | 11/2015 | Kirti | H04L 63/1416 726/23 |
| 2017/0171231 A1* | 6/2017 | Reybok, Jr. | H04L 63/1433 |
| 2017/0250953 A1* | 8/2017 | Jain | G06F 21/552 |

(Continued)

OTHER PUBLICATIONS

International Application No. PCT/US2022/082489, International Preliminary Report on Patentability, Mailed on Jul. 11, 2024, 9 pages.

(Continued)

*Primary Examiner* — Theodore C Parsons
*Assistant Examiner* — James P Moles
(74) *Attorney, Agent, or Firm* — Kilpatrick Townsend & Stockton LLP (57) ABSTRACT

In an example of a method described herein, historical events occurring over a network are detected, and at least one of the historical events is associated with an observed value of a categorical variable. A numerical aggregate value representing the observed value is updated by applying an exponential smoothing function to (i) a prior numerical aggregate value representing prior historical events associated with the observed value and (ii) a count of the historical events associated with the observed value. An event occurring over the network is detected and is associated with the observed value. Features are extracted from the event, where the features include an encoded feature based on the numerical aggregate value to represent the observed value. A predictive model is applied to the features to determine a score representing likelihood of an outcome. Based on the score, access to a resource of the network is controlled.

20 Claims, 6 Drawing Sheets

(56) References Cited

U.S. PATENT DOCUMENTS

| | | | |
|---|---|---|---|
| 2017/0353477 A1* | 12/2017 | Faigon | G06F 21/554 |
| 2018/0314965 A1* | 11/2018 | Dodson | G06N 20/00 |
| 2019/0065738 A1* | 2/2019 | Kim | G06F 21/57 |
| 2019/0098037 A1 | 3/2019 | Shenoy, Jr. et al. | |
| 2019/0236695 A1* | 8/2019 | McKenna | G06N 20/00 |
| 2019/0325528 A1* | 10/2019 | Adjaoute | G06N 3/006 |
| 2019/0370610 A1* | 12/2019 | Batoukov | G06F 11/0793 |
| 2020/0076841 A1* | 3/2020 | Hajimirsadeghi | H04L 63/1408 |
| 2020/0311603 A1* | 10/2020 | Qiu | G06N 20/20 |
| 2020/0366699 A1* | 11/2020 | Sampaio | G06F 16/24568 |
| 2021/0097545 A1* | 4/2021 | Laptiev | G06Q 20/24 |
| 2021/0160262 A1* | 5/2021 | Bynum | H04L 43/04 |
| 2021/0385252 A1* | 12/2021 | Lebin | G06F 21/52 |
| 2022/0222167 A1* | 7/2022 | Sampaio | G06F 16/2462 |
| 2022/0239682 A1* | 7/2022 | Ben Zvi | G06F 18/2415 |
| 2022/0303306 A1* | 9/2022 | Mir Bagheri | G06F 16/955 |
| 2023/0023646 A1* | 1/2023 | Xu | H04L 41/147 |

OTHER PUBLICATIONS

International Application No. PCT/US2022/082489, International Search Report and Written Opinion, Mailed on Apr. 5, 2023, 12 pages.

\* cited by examiner

EXPONENTIALLY SMOOTHED CATEGORICAL ENCODING TO CONTROL ACCESS TO A NETWORK RESOURCE

TECHNICAL FIELD

The present disclosure relates generally to network management. More specifically, this disclosure relates to techniques for controlling access to network resources by events based on exponentially smoothed categorical encodings of features of such events.

BACKGROUND

Network management is a key issue for devices operating over a data network. Generally, managing a data network involves implementing data policies and practices to protect the data network from malicious activity that could harm network operations or entities associated with the data network. Network management can include network security involving detecting malicious use of the data network. Often, malicious use is characterized by a similarity to past malicious use.

To facilitate network management, some existing organizations examine events utilizing the network and determine whether such events have the characteristics of events that proved malicious, or fraudulent, in the past. To this end, categorical features of events are encoded in numerical form to enable such categorical features to be used as input into a prediction model. The prediction model can then predict an outcome of such events, such as the likelihood that the events relate to fraud or other malicious activity.

SUMMARY

Various aspects of the present disclosure provide techniques for exponentially smoothed categorical encoding to control access to a network resource. Some examples described herein involve a screening system that monitors events occurring over a network and, based on the outcomes of historical events, determines whether to restrict access by an ongoing event to a network resource.

A screening system described herein may maintain a data store of exponentially smoothed aggregate values describing appearances of observed values of a categorical variable. The data store may include, for each observed value of a categorical variable, a total count aggregate representing an exponentially smoothed number of times the observed value was encountered in historical events, as well as a positive count aggregate representing an exponentially smoothed number of times the observed value was encountered in historical events that led to an outcome of interest. Some examples described herein utilize a recursive technique to update the total count aggregate and the positive count aggregate.

Upon detecting an ongoing event associated with an observed value of a categorical variable, some examples of the screening system construct a feature vector to represent the ongoing event. The feature vector may include an encoded feature representing the observed value, and that encoded feature is based on the total count aggregate and the positive count aggregate, which are exponentially smoothed. The screening system may provide the feature vector as input to a prediction model trained to predict the likelihood of the outcome of interest. The prediction model may then make a prediction about the outcome of the ongoing event based on the feature vector, and the screening system may control the event's access to a network resource based on that prediction.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Certain aspects and features of the present disclosure relate to implementing network management by controlling access to network resources based on exponentially smoothed categorical encoding of event features. Using techniques described herein, an example of a screening system could protect a data network from fraudulent or other malicious activity by blocking access to network resources, or an example of the screening system could make predictions and thereby control access to network resources for other purposes.

More specifically, a screening system described herein may maintain a data store of exponentially smoothed aggregate values describing appearances of observed values of a categorical variable. The data store may include, for each observed value of a categorical variable, a total count aggregate representing an exponentially smoothed number of times the observed value was encountered in historical events, as well as a positive count aggregate representing an exponentially smoothed number of times the observed value was encountered in historical events that led to an outcome of interest (e.g., fraud). Some examples described herein utilize a recursive technique to update the total count aggregate and the positive count aggregate in an efficient manner, such that the total count aggregate and the positive count aggregate can be updated frequently (e.g., once per minute) to keep these values up to date. Upon detecting an ongoing event associated with the observed value, some examples described herein construct a feature vector to represent the ongoing event. The feature vector may include an encoded feature representing the observed value, and that encoded feature is based on the total count aggregate and the positive count aggregate, which are exponentially smoothed. The screening system may provide the feature vector as input to a prediction model trained to predict the likelihood of the outcome of interest. The prediction model may then make a prediction about the outcome of the ongoing event based on the feature vector, and the screening system may control the event's access to network resources based on that prediction.

Existing systems for categorical encoding perform batch processing of historical events. For instance, an existing system accesses all historical events for a given time window, such as ninety days. For each observed value of a categorical variable, the existing system computes a count of all of such historical events with which the observed value is associated (i.e., in which the observed value appears) and, additionally, a positive count of all such historical events with which the observed value is associated and which led to an outcome of interest. The existing system performs this computation for each observed value of each categorical variable and, further, does so on a regular basis to keep the count and the positive count as updated as reasonably possible given constraints on resources. In some cases, updating the count and the positive count for all observed values of all categorical variables can take the better part of day and, if performed on a daily basis, can require nearly round-the-clock computations. This can be resource-inefficient in terms of both time and computing power. Further, despite the ongoing use of resources, the aggregate values may not be sufficiently up to date to capture fluctuations in the appearance of an observed value, thus leading to more false negatives or false positives as compared to using aggregate values that are updated more frequently.

Examples described herein offer technical improvements over existing systems in terms of time and computational resource usage as well as in terms of accuracy. By using exponential smoothing in categorical encodings instead of using a fixed window of time, encoded features can more accurately represent categorical variables such that the weight given to historical events wanes as those historical events move further away from the present time. Further, examples described herein utilize a recursive formula to update exponentially smoothed versions of a total count and a positive count for each observed value of a categorical variable, leading to significantly reduced computation and significantly faster computation time. This allows the exponentially smoothed versions of a total count and a positive count to be updated quickly, such as in real time, thereby enabling feature encodings to encapsulate recent events and even burst changes in characteristics of events. As a result, false positives and false negatives can be reduced in predictions of certain outcomes for ongoing events. In short, examples described herein are more resource efficient and more accurate than existing systems for categorical encoding.

Overview of a Screening System

Figure 1:
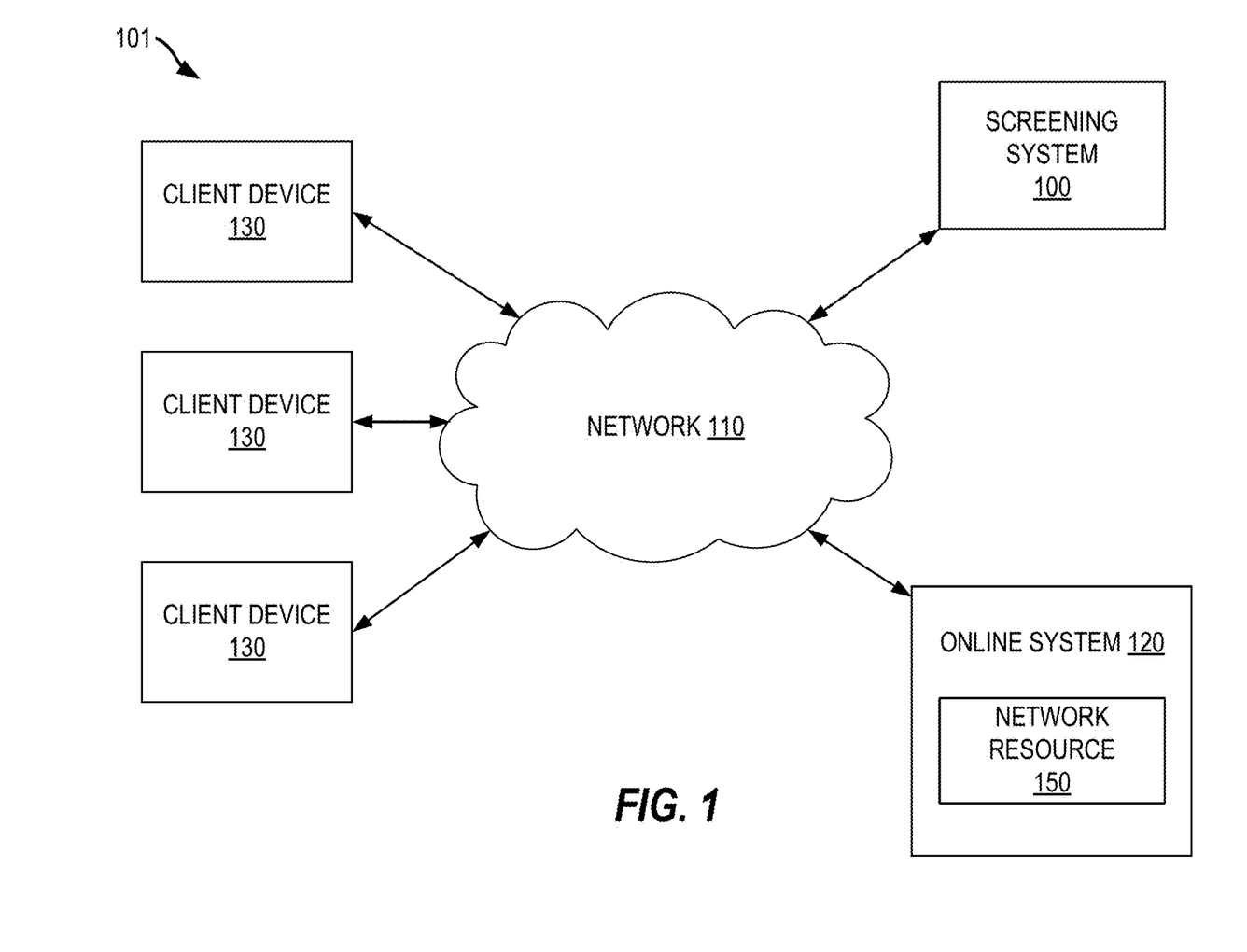
FIG. 1 is a block diagram of a system environment of a screening system that is configured to screen certain events from a network resource, according to some examples described herein.

Referring now to the drawings, FIG. 1 is a block diagram of a system environment 101 of a screening system 100 that is configured to screen (i.e., restrict) certain events from a network resource 150, according to some examples described herein. The system environment 101 can include the screening system 100, a network 110, one or more online systems 120 connected to the network 110, and one or more client devices 130 connected to the network 110. Although FIG. 1 shows a single online system 120 and three client device 130, one or multiple online systems 120 and one or multiple client devices 130 may be associated with the network 110. For instance, hundreds of thousands of client devices 130 may be associated with the network to utilize one or more online systems 120 associated with the network 110. In some examples, the system environment 101 can include other suitable components.

In some examples, the client devices 130 participate in events involving an online system 120, where such events occur over the network 110. The nature of the online system 120 and the events may vary across implementations. For example, an event can be a financial transaction between a client device 130 and the online system 120, where the online system 120 may be a server or other device associated with a financial institution or other provider and the client device 130 is operated by a consumer or financial advisor. In another example, the online system 120 is an advertising platform, and each event is an ad displayed via an online system 120 according to an advertising request that was made at or involves a client device 130 operated by a user. Various types of online systems 120 and events are possible and are within the scope of this disclosure.

Generally, the screening system 100 may monitor the events occurring between client devices 130 and the online system 120 over the network 110, and the screening system 100 may control access to a network resource 150 for a given event based on characteristics of that given event. Although a network resource 150 is shown in FIG. 1 as being part of an online system 120, that need not be the case. The network resource 150 may be integrated with the online system 120 or may be a resource available through the online system 120 or as a result of an interaction with the online system 120. More specifically, for instance, the screening system 100 may be configured utilize information about historical events to predict an outcome of an ongoing event. For instance, aspects of the screening system 100 may operate in real time to make a prediction before the ongoing event is completed, so as to control the event's access to a network resource 150.

In an example where events are financial transactions, for instance, the screening system 100 may monitor the events for potential fraud and may block events determined likely to be associated with an outcome of interest, specifically fraud, by controlling access to a network resource 150. In that case, the network resource 150 could be a payment server or a payment processing module configured to complete the financial transaction. In an example where events are ads that are served, for instance, the screening system 100 may monitor ads available to be served and may thus predict the likelihood of an outcome of interest, specifically conversion of such ads. If the screening system 100 determines that an ad is unlikely to convert, then the screening system 100 may control access to a network resource 150, specifically an available ad spot. Various applications are possible and are within the scope of this disclosure.

Events can be various types of online interactions performed between client devices 130 and online systems 120 over the network 110. An example of an event involves a client device 130 communicating with the online system 120. In some examples, an event is a financial transaction, the serving of an ad, a login attempt, an account creation, an identity verification process, or other suitable interaction. Each event has a set of attributes describing characteristics of that event. Attributes may include, for example, an email address of a user associated with the client device 130, a residential address of the user, a phone number of the user, an IP address of the client device 130, a country of origin, an Internet service provider, a device type, an event type, or other suitable attributes.

Each attribute may be associated with a particular value of a particular variable. In this disclosure, a variable is a field or set of fields (i.e., a placeholder or set of placeholders) that can take a variety of values, and an attribute is a particular value or set of values of a given variable. Some variables may be numerical, and other variables may be categorical. Generally, a numerical variable is a variable that can take values that are numbers. For instance, an account balance is an example of a numerical variable, and a particular account balance associated with an event is an attribute of that event. In contrast, a categorical variable is a variable that can take non-numerical values or values that are treated as non-numerical even if including digits. For instance, an email address and an IP address are examples of categorical variables and particular email addresses and account balances associated with events are attributes of those events.

Each event may be associated with a set of attributes, where each such attribute is associated with a field, or variable, configured to describe an aspect of that event. For instance, the screening system 100 may have access to attributes associated with one or more of the following variables describing events: type of event, timestamp of the event, dollar value associated with the event, name of an entity involved in the transaction, email address of an entity involved in the transaction, Internet Protocol (IP) address of a client device 130 involved in the event, or operating system of the client device 130. Additionally or alternatively, the screening system 100 may have access to other variables related to events. In some examples, an online system 120 involved in events communicates attributes of those events to the screening system 100, thereby enabling the screening system 100 to update information about historical events. The online system 120 may further transmit to the screening system 100 attributes about an ongoing event, thereby enabling the screening system 100 to implement an access control related to the ongoing event based on its stored information about historical events.

The client devices 130 can be one or more computing devices capable of receiving user input as well as transmitting or receiving data via the network 110. In some examples, a client device 130 can be a consumer device such as a personal computing device or other suitable types of user devices. The client device 130 can be a conventional computer system such as a desktop or a laptop computer. Alternatively, the client device 130 may be a device having computer functionality such as a personal digital assistant (PDA), a mobile telephone, a smartphone, or other suitable device. The client device 130 can be configured to communicate via the network 110. In some examples, the client device 130 can execute an application allowing a user of the client device 130 to interact with the online systems 120. For example, the client device 130 can execute a browser application to enable interaction between the client device 130 and the online systems 120 via the network 110. In some examples, the client device 130 can interact with the online systems 120 through an application programming interface (API) running on a native operating system of the client device 130, such as iOS® or Android™.

A client device 130 can be configured to communicate via the network 110, which may include a combination of local area networks or wide area networks, using wired communications systems, wireless communication systems, or a combination thereof. In some examples, the network 110 can use standard communications technologies or protocols. For example, the network 110 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format such as hypertext markup language (HTML) or extensible markup language (XML). In some examples, all or some of the communication links of the network 110 may be encrypted using any suitable technique or techniques.

One or more online systems 120 may be coupled to the network 110, thereby enabling client devices 130 to participate in events involving the online system 120 over the network 110. In some examples, the online system 120 can be an application provider communicating information describing applications for execution by the client device 130, or communicating data to client devices 130 for use by an application executing on the client device 130. The online system 120 can be operated by a third party and can provide a graphical user interface for users to conduct events (e.g., transactions) with the third party using the client device 130. In some examples, the online system 120 can provide content or other information for presentation via the client device 130. The online system 120 can communicate information to the screening system 100 describing events between the online system 120 and the client devices 130.

Although various implementations of an online system 120 are possible and are within the scope of this disclosure, in some examples, the online system 120 may include a web server that can link the online system 120 via the network 110 to the one or more client devices 130, as well as to the screening system 100. The web server can serve web pages, as well as other content such as Java®, Flash®, XML, and the like. The web server may receive and route messages between the online system 120 and the client device 130. The web server may receive transaction requests to perform an action such as to login to an account or to create an account. Additionally or alternatively, the web server may provide application programming interface (API) functionality to send data directly to native client device operating systems.

Figure 2:
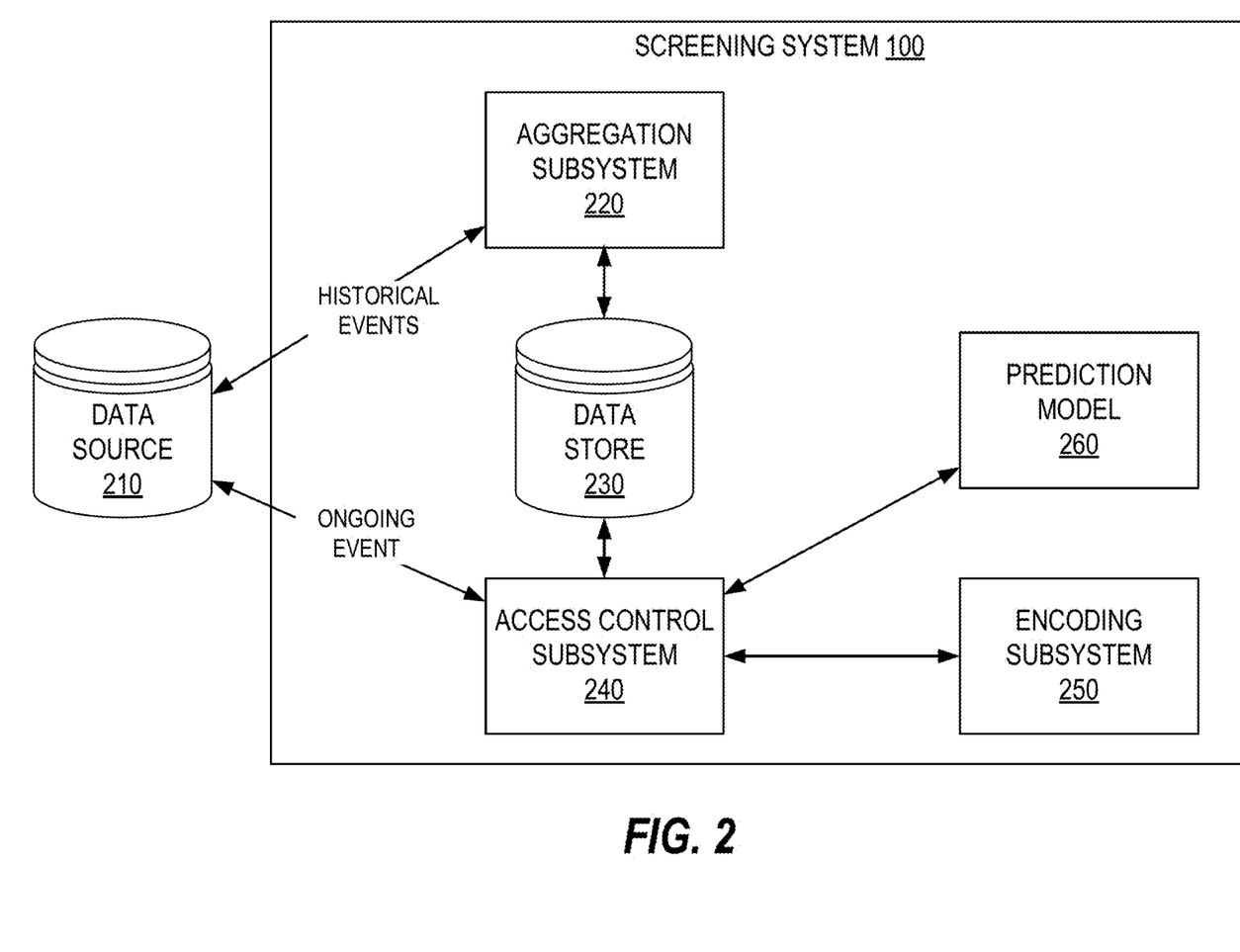
FIG. 2 is a diagram of an example of a screening system configured to screen certain events from a network resource, according to some examples described herein.

FIG. 2 is a diagram of an example of a screening system 100 configured to control access to one or more network resources 150, according to some examples described herein. As shown in FIG. 2, an example of the screening system 100 is in communication with a data source 210 and includes an aggregation subsystem 220, a data store 230, an access control subsystem 240, an encoding subsystem 250, and a prediction model 260. The aggregation subsystem 220, the data store 230, the access control subsystem 240, the encoding subsystem 250, and the prediction model 260 may be implemented as hardware, software, or a combination of both. Although the aggregation subsystem 220, the data store 230, the access control subsystem 240, the encoding subsystem 250, and the prediction model 260 are described as being distinct, such distinction is for illustrative purposes only, and these elements can share hardware or software or can be further divided. For instance, the aggregation subsystem 220 and the encoding subsystem 250 may be performed by the same components or combination of components.

In some examples, the data source 210 is a source of information describing events occurring over the network 110. For instance, the data source 210 may be an online system 120 involved in such events or maintaining information about such events. In some examples, the data source 210 has access to real-time or nearly real-time information about events occurring or being attempted over the network 110. More specifically, for instance, if the screening system 100 is configured to identify and prevent fraudulent financial transactions, the data source 210 could be an online system 120 acting as a server that participates in such events, such as a payment processing server or a server that provides goods or services related to such financial transactions. If the screening system 100 is configured to predict ad conversion, the data source 210 could be part of an online system 120 that is integrated with an advertising platform.

The aggregation subsystem 220 may detect historical events (i.e., events that have already occurred) and update information in the data store 230 based on the historical events. To this end, the aggregation subsystem may be in communication with both the data source 210 and the data store 230 as shown in FIG. 2. In some examples, the data source 210 forwards information about historical events to the aggregation subsystem 220, or additionally or alternatively, the aggregation subsystem 220 queries the data source 210 to obtain information about historical events that have occurred. Upon detecting historical events that have occurred, the aggregation subsystem 220 may update the data store 230 with aggregate values associated with those historical events and, more specifically, aggregate values associated with observed values of categorical variables describing the historical events.

The data store 230 may maintain information describing historical events, such as historical events that have occurred over the network 110. For instance, the data store 230 could be a database, one or more rows or tables of a database, or some other storage object or collection of storage objects capable of maintaining information describing values of categorical variables. As described above, one or more attributes of the events, such as historical events, may be represented as categorical variables. The data store 230 may map each observed value of each categorical variable to one or more aggregate values describing the appearance of that observed value. As described above, an observed value of a categorical variable may be non-numerical, but the prediction model 260 being used to make predictions about outcomes of events may be configured to operate on numerical inputs. As such, the data store 230 may map such observed values to the aggregate values useable as input, or as a basis for input, into the prediction model 260.

More particularly, an example of the data store 230 maintains each observed value of a categorical variable as a categorical key (e.g., a row key), which can be looked up in the data store 230. In the data store 230, each categorical key, and thus each corresponding observed value, is mapped to one or more aggregate values representing that categorical key. In some examples, one or more than one categorical variable may be represented in the data store 230. For instance, the data store 230 may map observed values of a first categorical variable, such as email addresses of an involved entities, to associated aggregate values and may also map observed values of a second categorical variable, such as IP addresses of involved client devices 130, to associated aggregate values. In that case, each of such observed values may be represented as a categorical key in the data store 230 and may thus have a corresponding set of aggregate values.

In some examples, the data store 230 is or includes a database table. In that case, each row of the database table has a categorical key, which acts as a row key, including (e.g., equal to) a corresponding observed value of a categorical variable. The columns of the database table may include a respective column for each aggregate value being used to represent the categorical key and thus to represent the observed value. Some examples of the screening system 100 utilize a first aggregate value representing a count of times the observed value appeared in historical events and a second aggregate value representing a count of times the observed value appeared in historical events associated with an outcome of interest (e.g., associated with fraud). In that case, each of the first aggregate value and the second aggregate value may be represented by a respective column in the database table. However, various implementations are possible and are within the scope of this disclosure. Additionally, in some examples, each categorical key represented in the data store 230 may be associated with a timestamp indicating the last time the corresponding aggregate values for that observed value were updated. As described in more detail below, aspects of the screening system 100 may utilize the timestamp to update the aggregate values as needed.

The access control subsystem 240 may control an event's access to a network resource 150 based on features of that event. In some examples, the access control subsystem 240 receives attributes of an event, such as while that event is ongoing, from a data source 210 such as an online system 120 participating in the event. The access control system may construct a feature vector describing and representing the event. That feature vector may include an encoded feature that is numerical and that represents an observed value of a categorical variable associated with the event. For instance, if the event is associated with an email address of a user, an encoded feature representing that email address may be included in the feature vector. To determine the encoded feature, the access control subsystem 240 may query the encoding subsystem 250 with the observed value of the categorical variable, and the encoding subsystem 250 may return the ended feature for use in the feature vector. The access control subsystem 240 may provide the feature vector as input to the prediction model 260, which may compute a score indicating the likelihood that the event is associated with an outcome of interest.

The encoding subsystem 250 may access the data store 230 as needed to provide categorical encoding for an observed value of a categorical variable associated with an event. In some examples, the encoding subsystem 250 operates in real time or nearly real time so as to encode the observed value before the event is completed. The encoding subsystem 250 may access the data store 230 to map the observed value to the set of one or more aggregate values associated with the categorical key matching the observed value. In some examples, the encoding subsystem 250 updates the set of aggregate values based on the current time. The encoding subsystem 250 may then determine an encoded feature based on the set of aggregate values. That encoded feature may be used in a feature vector representing the event, and that feature vector may be provided as input to the prediction model 260 to enable the prediction model 260 to make a prediction about the outcome of the event.

The prediction model 260 may be a suitable machine-learning model configured to take as input a feature vector describing an event and to compute and output a score indicating a likelihood that the event leads to an outcome of interest. In some examples, the prediction model 260 is a neural network or a decision tree, but various types of machine-learning models are useable as the prediction model 260 within the scope of this disclosure. In advance of use in the screening system, an example of the prediction model 260 is trained for this purpose, for instance, using one or more training techniques known in the art. In one example, the prediction model 260 is trained to identify fraud in financial transactions, and in that case, training of the prediction model 260 may seek to minimize the error between actual outcomes (i.e., whether the financial transactions were fraudulent) of financial transactions and predicted outcomes of those financial transactions based on feature vectors describing those financial transactions. After training, the prediction model 260 may be thus configured to map feature vectors describing events to likelihoods that those events lead to the outcome of interest on which the prediction model 260 was trained.

As described above, existing systems perform batch processing of events when performing categorical encoding. For instance, an existing system accesses all known events for a given time window, such as ninety days. For each observed value of a categorical variable, the existing system computes an aggregate value as a function of all of such events with which the observed value is associated, in that the observed value appears in such events. In such existing systems, all historical events within the time window are weighted equally and thus equally impact the encodings of observed values. Examples of a screening system 100 described herein, however, utilize exponential smoothing to ensure that more recent historical events are weighted more heavily than older historical events.

In some examples, the screening system 100 (e.g., the aggregation subsystem 220 or the encoding subsystem 250, or both) computes or utilizes two aggregate values per observed value of a categorical variable. A first aggregate value may be a total count aggregate, which is a representation of how many times the observed value was observed in a set of historical events. A second aggregate value may be a positive count aggregate, which is a representation of how many times the observed value was observed in association with an outcome of interest or, in other words, how many times events with the observed value led to the outcome of interest.

Let $f_v(t)$ denote an exponentially smoothed value for the event function $v(e)$ over the time-ordered set $e \in E$ of $n=|E|$ historical events corresponding to a particular categorical key (i.e., a particular observed value for a particular categorical variable), and let $t(e)$ to denote the time of event e. For example, in the case of a positive or negative binary outcome of each event, $v(e)$ is either 0 or 1 depending on the outcome of the event e. In the case of a non-binary outcome, $v(e)$ may be between 0 and 1 inclusively. If the screening system 100 computes the total count aggregate using exponential smoothing using batch processing, such as on historical events that occurred over the past ninety days, the total count aggregate could be computed as an exponentially decayed event function $f_v(t)$ as follows:

$$f_v(t) = \sum_{e \in E} \alpha^{t-t(e)} v(e)$$

In the above equation, $\alpha$ is a decay parameter controlling how quickly the emphasis on historical events decays as time passes. The value of $\alpha$ is a real number between 0 and 1 inclusively.

In some examples, though, the aggregation subsystem 220 updates the data store with updated aggregate values more frequently than is done in existing systems. For instance, the aggregation subsystem 220 could update aggregate values for all categorical keys once per hour or once per minute. Further, the encoding subsystem 250 may update one or more of the aggregate values for a categorical key with low latency, such as in real time before an event is completed. In these cases, the above computation could be infeasible or inefficient due to database or computational limitations. As such, some examples of the aggregation subsystem 220 or the encoding subsystem 250, or both, utilize recursion to update the aggregate values based on the aggregate values already stored in the data store 230. The recursion can be derived from the above equation by factoring out the exponential decay from the time of the previous event, as follows:

$$f_v(t) = \alpha^{t-t(e_n)} \sum_{e \in E} \alpha^{t(e_n)-t(e)} v(e)$$

Removing the most recent event from the sum gives the following:

$$f_v(t) = \alpha^{t-t(e_n)} \left( \alpha^{t(e)-t(e)} v(e_n) + \sum_{e \in E, e \neq e_n} \alpha^{t(e_n)-t(e)} v(e) \right)$$

The above can be represented as the following recursion:

$$f_v(t) = \alpha^{t-t(e_n)} \left( v(e_n) + \alpha^{t(e_n)-t(e_{n-1})} f_v(t(e_{n-1})) \right)$$

In some examples, the aggregation subsystem 220 or the encoding subsystem, or both, can determine the positive count aggregate using a similar recursion but considering only historical events that are associated with the outcome of interest rather than considering historical events regardless of outcome. In some examples, when the aggregation subsystem 220 and the encoding subsystem 250 use the above recursion to determine an aggregate value, there is no need to access and utilize a large set of historical events to determine that aggregate value. For instance, to determine the total count aggregate, the screening system 100 (e.g., the aggregation subsystem 220 or the encoding subsystem) may require access to $f_v(t)$ and $t(e_n)$ for the historical events having the observed value. The screening system 100 may compute the total count aggregate from these two values using the above equation, without need for data describing individual historical events. Similarly, for instance, to determine the positive count aggregate, the screening system 100 (e.g., the aggregation subsystem 220 or the encoding subsystem) may require access to $f_v(t)$ and $t(e_n)$ for the historical events having the observed value and associated with the outcome of interest. The screening system 100 may compute the positive count aggregate from these two values using the above equation, without need for data describing individual events. Computing the aggregate values in this manner can result in a saving of both storage and computational power while also achieving reduced latency and, because the computations can be performed more frequently, improved accuracy.

Examples of Operations

Figure 3:
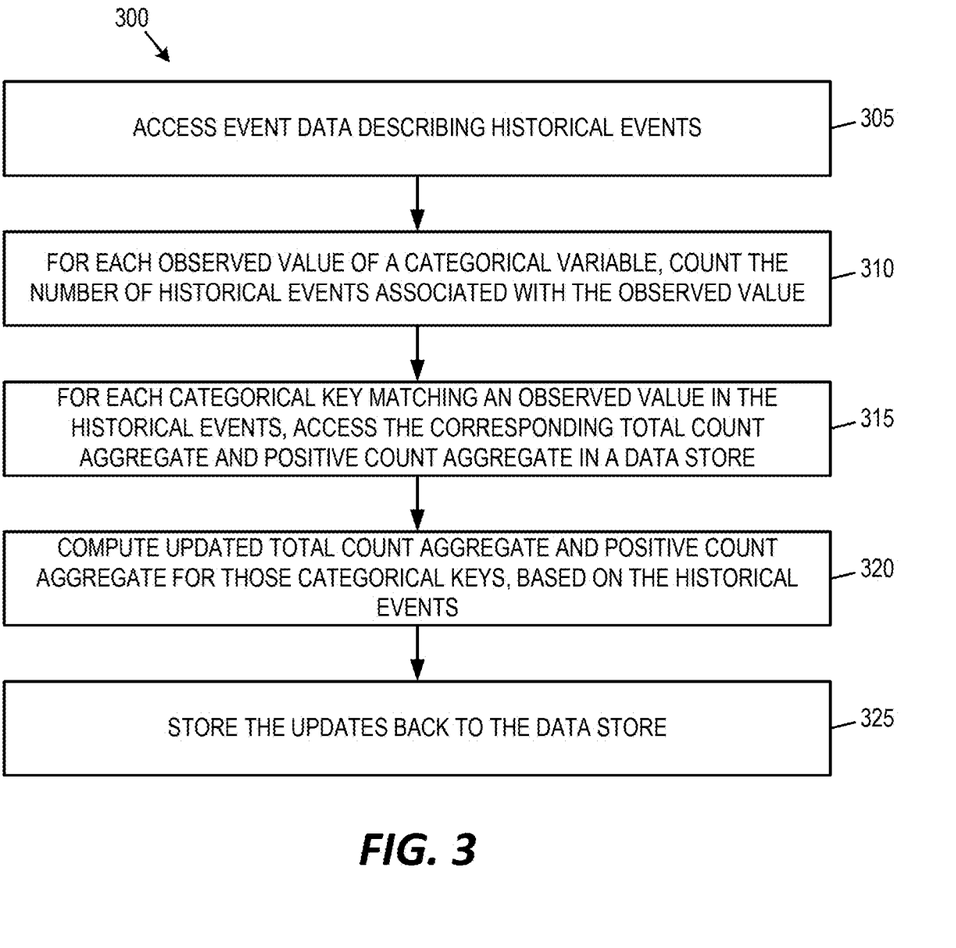
FIG. 3 is a flow diagram of a process for updating exponentially smoothed aggregate values maintained in a data store and used for categorical encoding, according to some examples described herein.

FIG. 3 is a flow diagram of a process 300 for updating aggregate values maintained in the data store 230, according to some examples described herein. The process 300 depicted in FIG. 3 may be implemented in software (e.g., code, instructions, program) executed by one or more processing units of a computer system, implemented in hardware, or implemented in a combination of software and hardware. The process 300 presented in FIG. 3 and described below is intended to be illustrative and non-limiting. Although FIG. 3 depicts various processing operations occurring in a particular sequence or order, this is not intended to be limiting. In certain alternative examples, the processing may be performed in a different order or some operations may also be performed in parallel. In some examples, the aggregation subsystem of the screening system 100 performs some or all operations of this process 300. Further, in some examples, the aggregation subsystem performs this process 300 or similar on a periodic basis, such as once per day, once per hour, or once per minute.

As shown in FIG. 3, at block 305, the process 300 involves accessing event data describing historical events. For example, the screening system 100 may receive the event data from the data source 210. In some examples, the historical events are events that have occurred since the last time the aggregation subsystem 220 ran to update the aggregate values as maintained in the data store 230. For instance, this may be an hour's worth or a minute's worth of historical events if the data store 230 is being updated every hour or every minute, respectively. For each historical event in the event data, the event data may indicate a timestamp of the historical event and a respective observed value (i.e., a value observed as associated with the historical event) for each categorical variable for which an observed value is known.

At block 310, the process 300 involves, for each observed value for each categorical variable in the historical events, counting associated historical events having that observed value for the categorical variable. Specifically, for instance, the aggregation subsystem 220 may determine the total count of the historical events having the observed value and may also determine the count (i.e., the positive count) of the historical events having the observed value and associated with an outcome of interest.

In some examples, for each observed value that is not already a categorical key in the data store 230, the aggregation subsystem 220 may update the data store 230 to add the observed value as a new categorical key. The aggregate values for that new categorical key can be set to zero with a timestamp equal to the last update of the data store 230 or to some other default value. Any categorical keys whose associated observed values are not found in the historical events may be ignored such that the corresponding aggregate values and associated timestamp are not to be updated at this time.

At block 315, the process 300 involves, for each categorical key observed in the historical events, accessing a stored aggregate value for that categorical key. For instance, the aggregation subsystem 220 may access the one or more aggregate values associated with the categorical key in the data store 230. These aggregate values may include the total count aggregate and the positive count aggregate as maintained in the data store 230.

At block 320, the process 300 involves, for each categorical key (i.e., each observed value of each categorical variable) observed in the historical data, computing updated values for the one or more aggregate values. In some examples, the aggregation subsystem 220 uses the recursion described above to compute an updated total count aggregate as a function of (i) the total count of historical events associated with the categorical key (i.e., having the categorical key as an observed value of a categorical variable) as determined at block 310 and (i) the total count aggregate accessed at block 315. Additionally or alternatively, in some examples, the aggregation subsystem 220 uses the recursion described above to compute an updated positive count aggregate as a function of (i) the total count of historical events associated with the categorical key that led to the outcome of interest as determined at block 310 and (i) the positive count aggregate accessed at block 315.

At block 325, the process 300 involves storing the aggregate values computed in block 320 back to the data store 230. In some examples, for each categorical key observed in the historical events, the aggregation subsystem 220 may update the total count aggregate and the positive count aggregate in the data store 230 to equal the respective total count aggregate and positive count aggregate computed through recursion in block 320. The aggregation subsystem 220 may modify the timestamp associated with each such categorical key observed in the historical events to the current time at which the aggregation subsystem 220 is updating the data store 230.

Figure 4:
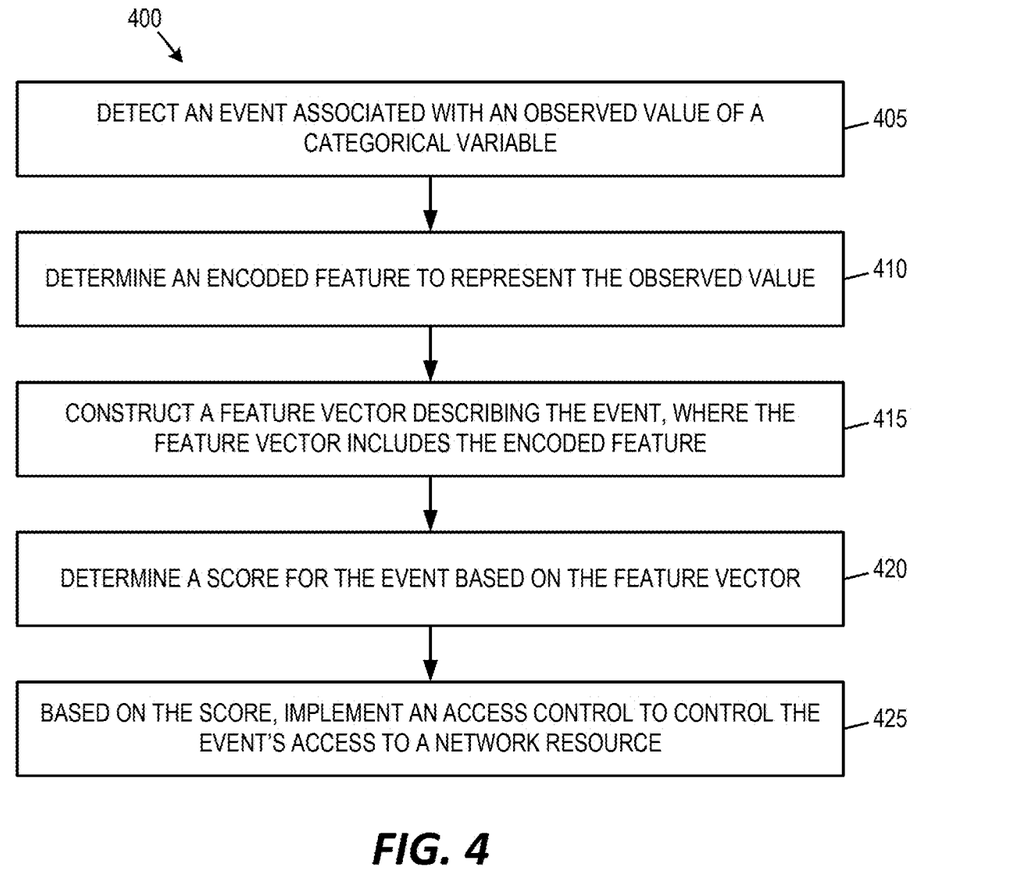
FIG. 4 is a flow diagram of a process for controlling access to a network resource using categorical encodings, according to some examples described herein.

FIG. 4 is a flow diagram of a process 400 for controlling access to a network resource 150 using exponentially smoothed categorical encodings, according to some examples described herein. The process 400 presented in FIG. 4 and described below is intended to be illustrative and non-limiting. Although FIG. 4 depicts various processing operations occurring in a particular sequence or order, this is not intended to be limiting. In certain alternative examples, the processing may be performed in a different order or some operations may also be performed in parallel. In some examples, various aspects of the screening system 100 perform the operations of this process 400 upon detection of an event being attempted. This screening system 100 may perform the process 400 in real time, or nearly real time, to implement an access control related to the event as needed.

As shown in FIG. 4, at block 405, the process 400 involves detecting an event. For instance, an online system 120 involved in the event may transmit event data describing attributes of the event to the access control subsystem 240 of the screening system 100, and in that case, the online system 120 acts as the data source 210 for the screening system 100. The event may be ongoing or, in other words, not yet completed, and as such, the screening system 100 may have the opportunity to control the event's access to a network resource 150. In some examples, the event data includes a set of attributes describing the event, and such attributes include an observed value of a categorical variable.

At block 410, the process 400 involves determining an encoded feature to represent the observed value. In some examples, the encoded feature is numerical and can thus be provided as a numerical input to the prediction model 260. To determine the encoded feature, for instance, the access control subsystem 240 of the screening system 100 may query the encoding subsystem 250 with the observed value, and the encoding subsystem 250 may return the encoded feature in response to that query. Operations performed by the encoding subsystem 250 to compute the encoded feature are described in detail below. If the event data includes multiple observed values for multiple categorical variables, then the screening system 100 may determine a respective encoded feature for each such observed value.

At block 415, the process 400 involves constructing a feature vector describing and thus representing the event. As described above, the prediction model 260 may take as input a feature vector describing an event, where the feature vector includes a set of values, such as numerical values. In some examples, attributes of the event other than those associated categorical variables are represented by numerical values or other values on which the prediction model 260 is configured to operate. Thus, the access control subsystem 240 can construct the feature vector by including a set of attributes of the event, including the encoded feature, in the feature vector.

At block 420, the process 400 involves determining a score for the event based on the feature vector. In some examples, to determine the score, the access control subsystem 240 provides, as input to the prediction model 260, the feature vector determined at block 415. The prediction model 260 may then operate on the feature vector to compute the score. The score may represent a likelihood that the event will lead to the outcome of interest on which the prediction model 260 was trained. For example, in a case where the screening system 100 is configured to detect fraudulent transactions among events, the prediction model 260 may output a score indicating a risk value, which indicates a likelihood that the event is a fraudulent transaction.

At block 425, the process 400 involves implementing an access control for a network resource 150 if the score determined at block 420 meets a threshold. Depending on how the prediction model 260 is trained, the threshold may be a minimum threshold or a maximum threshold. If the threshold is a minimum threshold, then the score may be deemed to meet the threshold if the score is below, or equal to, the threshold. If the threshold is a maximum threshold, then the score may be deemed to meet the threshold if the score is greater than, or equal to, the threshold.

In some examples, if the score does not meet the threshold, the access control subsystem 240 may allow the event to access the network resource 150. However, if the score meets the threshold, then the access control subsystem 240 may restrict access to the network resource 150 by blocking or limiting access to the network resource 150. Restriction of access to the network resource 150 can take various forms. In some examples, the access control subsystem 240 of the screening system 100 directly or indirectly provides access controls for the event. To this end, for instance, the access control subsystem 240 notifies the online system 120 that the event is restricted, and in turn, the online system 120 restricts access for the event, such as by preventing the event from proceeding or requiring increased security (e.g., authentication from a client device 130 involved in the event). In some examples, the event may be subjected to further verification based upon the risk value. For example, the screening system 100 may challenge the event request by forwarding the event request to two-factor or multi-factor authentication, may request that the requestor entity answer security questions, may require a Captcha, may require some other security verification which increases friction to dissuade malicious behavior, or a combination thereof. Additionally or alternatively, the access control subsystem 240 can directly block the event, at least temporarily, such as in a case in which the screening system 100 has to approve each individual event for the online system 120.

Figure 5:
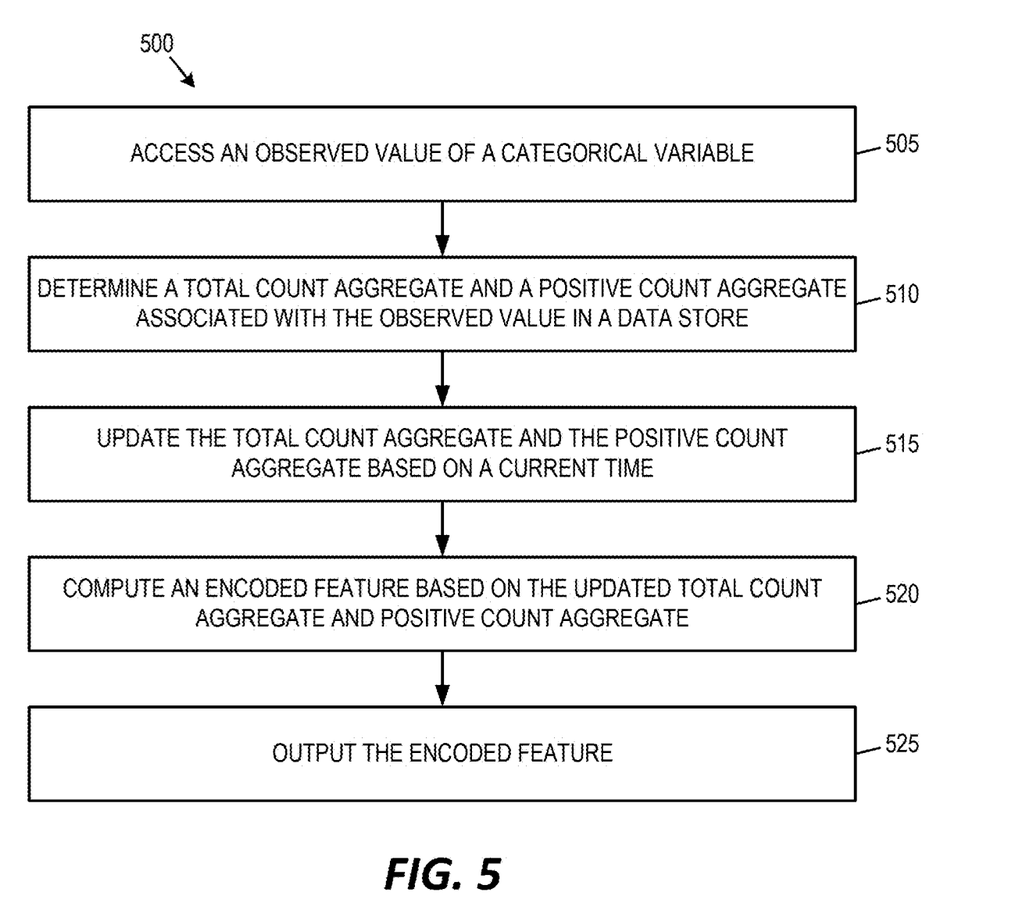
FIG. 5 is a flow diagram of a process for encoding an observed value of a categorical variable based on exponentially smoothed aggregate values, according to some examples described herein.

FIG. 5 is a flow diagram of a process 500 for encoding an observed value of a categorical variable, according to some examples described herein. The process 500 depicted in FIG. 5 may be implemented in software (e.g., code, instructions, program) executed by one or more processing units of a computer system, implemented in hardware, or implemented in a combination of software and hardware. The process 500 presented in FIG. 5 and described below is intended to be illustrative and non-limiting. Although FIG. 5 depicts various processing operations occurring in a particular sequence or order, this is not intended to be limiting. In certain alternative examples, the processing may be performed in a different order or some operations may also be performed in parallel. In some examples, the encoding subsystem 250 of the screening system 100 performs some or all operations of this process 500. Further, in some examples, the encoding subsystem 250 performs this process 500 or similar in response to being queried with an observed value of a categorical variable, as at block 410 of the above process 400.

As shown in FIG. 5, at block 505, the process 500 involves accessing an observed value of a categorical variable. As described above, the observed value may be associated with an event and may be provided to the encoding subsystem 250 by the access control subsystem 240.

At block 510, the process 500 involves determining one or more aggregate values, along with a timestamp indicating when the one or more aggregate values were last updated, associated with the observed value of the categorical variable. In some examples, the encoding subsystem 250 accesses the data store 230 and identifies the one or more aggregate values associated with the categorical key corresponding to the observed value. As described above, these aggregate values may include a total count aggregate and a positive count aggregate. The encoding subsystem 250 may also identify the timestamp associated with the categorical key, and thus with the aggregate values, stored in the data store 230.

If the observed value does not have a matching categorical key in the data store 230, as might be case if no historical events yet used to update the data store 230 have been associated with the observed value, then the encoding subsystem 250 may utilize default values for the one or more aggregate values and the timestamp. For instance, the default for each aggregate value may be zero, and the default timestamp may be the time at which the data store 230 was last updated based on historical events.

At block 515, the process 500 involves updating each of the one or more aggregate values based on the time of the event. Because the event may be ongoing, the time of the event may be assumed to be the current time. As described above, an aggregate value may be computed using exponential smoothing such that older events gradually lose their emphasis. Given that time has likely passed since the aggregate value was last updated, exponential smoothing based on the current time is likely to lead to a modified value. To update an aggregate value, the encoding subsystem 250 may use the formula described above, as applied to the aggregate value identified at block 510 and as applied to the timestamp associated with that aggregate value:

$$f_v(t) = \alpha^{t-t(e_n)}\left(v(e_n) + \alpha^{t(e_n)-t(e_{n-1})} f_v(t(e_{n-1}))\right)$$

At block 520, the process involves computing, based on the one or more aggregate values computed at block 515, an encoded feature to represent the observed value of the categorical variable. In some examples, the one or more aggregate values are a basis for the encoded feature. For instance, the encoded feature is an aggregate value, or a combination of aggregate values, computed at block 515. Alternatively, however, the encoded feature can be a function of the one or more aggregate values. Various techniques exist for converting aggregate values into encoded features, and the encoding subsystem 250 may apply one or more of such techniques to the one or more aggregate features.

In some examples, the encoding subsystem 250 applies a Target Encoding technique to the one or more aggregate values. Target Encoding typically takes as input (i) a total count of events having an observed value of a categorical variable and (ii) a positive count of events having a positive outcome (i.e., the outcome of interest). However, an example of the encoding subsystem 250 utilize a modified Target Encoding that takes as input the total count aggregate, in place of the conventional total count, and a positive count aggregate, in place of the conventional positive count. Let $n(x)$ be the total count aggregate and $n_p(x)$ be the positive count aggregate. The modified Target Encoding $T'(x)$ may be computed as a weighted average of the prior $\pi$, combined with the positive count aggregate over the total count aggregate, $n_p(x)/n(x)$. In some examples of the encoding subsystem 250, the prior $\pi$ is a pre-calculated value, such as a pre-calculated risk value, correlated to the proportion of positive or negative events across instances (e.g., all known instances) of the observed value. The pre-calculated value can be used as a baseline.

Specifically, in some examples, the encoding subsystem 250 computes the modified Target Encoding as follows:

$$T'(x) = \pi(1-s) + s\frac{n_p(x)}{n(x)}$$

In the above, s can depend on the total count aggregate as follows:

$$s = \frac{1}{1+\exp\left(-\frac{n(x)-mdl}{a}\right)}$$

As shown, the above weighting may be parameterized by the minimum data samples mdl and by a smoothing parameter a. In some examples, the smoothing parameter a is greater than 0 and impacts the emphasis given to current versus prior instances of the observed value. Further, in some examples, the value of mdl equals the minimum number of times the observed values must be encountered before the modified Target Encoding technique is applied. For instance, if mdl is set to 5, the encoding subsystem 250 does not compute the modified Target Encoding using the above formula until $n(x) \geq 5$, but if mdl is set to 1, the encoding subsystem 250 can compute the Target Encoding using the above formula if the observed value was encountered at all.

The encoding subsystem 250 may utilize this modified Target Encoding as the encoded feature in some examples. Because the modified Target Encoding is based on the total count aggregate and the positive count aggregate, which are exponentially smoothed, the encoded feature therefore incorporates this exponential smoothing such that the emphasis of historical events wanes logically over time.

At block 525, the process 500 involves outputting the encoded feature to represent the observed value of the categorical variable. For instance, the encoding subsystem 250 outputs the encoded feature to the access control subsystem 240, which may then incorporate the encoded feature into a feature vector for input into the prediction model 260 to predict an outcome for a given even associated with the observed value of the categorical variable. In some examples, because the encoded feature is exponentially smoothed based on the current time and, further, based on the timestamps of historical events, the encoded feature for a given observed value may change over time. And thus, the encoding subsystem 250 may execute this process 500 or similar each time an encoded feature is desired for a given observed value of a categorical variable.

Examples of a Computing System Implementing a Screening System

Figure 6:
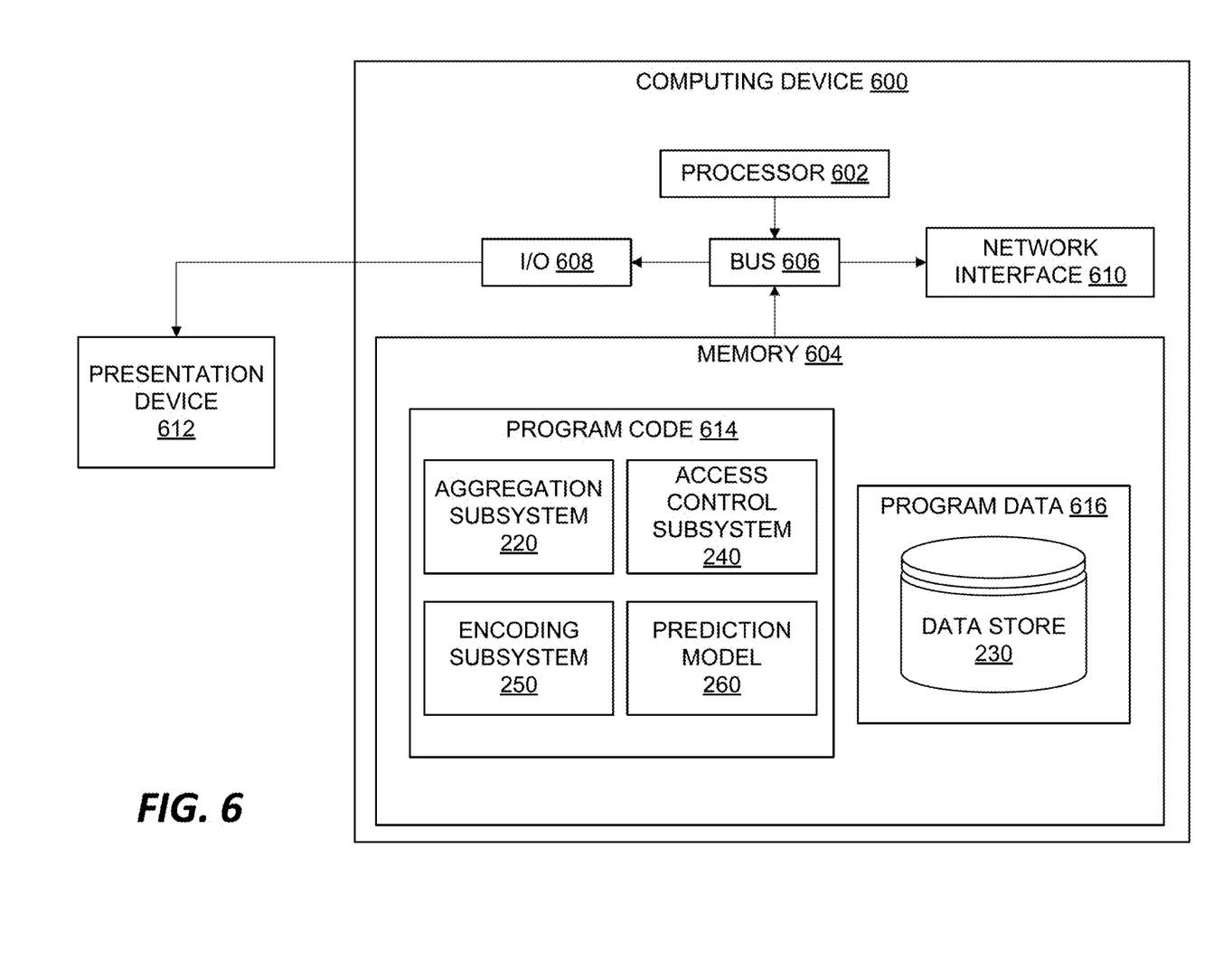
FIG. 6 is a diagram of a computing system suitable for implementing aspects of the techniques and technologies presented herein, according to some examples described herein.

A suitable computing system or group of computing systems can be used to perform the operations for the operations described herein. For example, FIG. 6 is a block diagram depicting an example of a computing device 600 that can be used to implement the screening system 100 according to some examples of the present disclosure. The computing device 600 can include various devices for communicating with other devices in the system environment 101, as described with respect to FIG. 1. The computing device 600 can include various devices for performing one or more operations described above with reference to FIGS. 1-5.

For instance, the computing device 600 can include a processor 602 that can be communicatively coupled to a memory 604. The processor 602 can execute computer-executable program code stored in the memory 604, can access information stored in the memory 604, or a combination thereof. Program code may include machine-executable instructions that may represent a procedure, a function, a subprogram, a program, a routine, a subroutine, a module, a software package, a class, or any combination of instructions, data structures, or program statements, or other suitable types of machine-executable instructions. A code segment may be coupled to another code segment or a hardware circuit by passing or receiving information, data, arguments, parameters, or memory contents. Information, arguments, parameters, data, and the like may be passed, forwarded, or transmitted via any suitable means including memory sharing, message passing, token passing, network transmission, and other suitable means.

Examples of the processor 602 can include a microprocessor, an application-specific integrated circuit (ASIC), a field-programmable gate array (FPGA), or any other suitable processing device. The processor 602 can include any number of processing devices, including one. The processor 602 can include or communicate with the memory 604. The memory 604 can store program code that, when executed by the processor 602, can cause the processor 602 to perform the operations described herein.

The memory 604 can include a suitable non-transitory computer-readable medium. The computer-readable medium can include an electronic, optical, magnetic, or other storage device capable of providing a processor with computer-readable program code or other program code. Non-limiting examples of a computer-readable medium can include a magnetic disk, a memory chip, optical storage, flash memory, storage class memory, ROM, RAM, an ASIC, magnetic storage, or any other medium from which a computer processor can read program code, execute program code, or a combination thereof. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, and the like.

The computing device 600 may additionally include a number of external or internal devices such as input devices, output devices, or a combination thereof. For example, the computing device 600 is illustrated in FIG. 6 with an input/output interface 608 that can receive input from input devices or provide output to output devices. A bus 606 can be included in the computing device 600. The bus 606 can communicatively couple one or more components of the computing device 600.

The computing device 600 can execute program code 614 that can include aspects of the screening system 100, such as the aggregation subsystem 220, the access control subsystem 240, the encoding subsystem 250, and the prediction model 260. The program code 614 for aspects of the screening system 100 may be resident in any suitable computer-readable medium and may be executed on any suitable processing device. For example, as illustrated in FIG. 6, the program code 614 for the aggregation subsystem 220, the access control subsystem 240, the encoding subsystem 250, and the prediction model 260 can reside in the memory 604 of the computing device 600 along with program data 616 associated with the program code 614, such as data included in the data store 230. Executing the aggregation subsystem 220, the access control subsystem 240, the encoding subsystem 250, the prediction model 260, or other aspects of the screening system 100 can configure the processor 602 to perform the operations described herein.

In some aspects, the computing device 600 can include one or more output devices. One example of an output device can include a network interface device 610. The network interface device 610 can include any device or group of devices suitable for establishing a wired or wireless data connection to one or more data networks described herein. Non-limiting examples of the network interface device 610 can include an Ethernet network adapter, a modem, etc.

Another example of an output device can include a presentation device 612. The presentation device 612 can include any device or group of devices suitable for providing visual, auditory, or other suitable sensory output. Non-limiting examples of the presentation device 612 can include a touchscreen, a monitor, a speaker, a separate mobile computing device, or other suitable presentation devices. In some aspects, the presentation device 612 can include a remote client-computing device that communicates with the computing device 600 using one or more data networks described herein. In other aspects, the presentation device 612 can be omitted.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
   detecting historical events occurring over a network, wherein at least one of the historical events is associated with an observed value of a categorical variable;
   updating, through a recursive technique, a numerical aggregate value representing the observed value of the categorical variable, the numerical aggregate value based on both (i) an exponentially smoothed prior numerical aggregate value representing prior historical events associated with the observed value and (ii) an exponentially smoothed positive count aggregate representing a number of times the historical events associated with the observed value led to an outcome of interest, wherein the numerical aggregate value is computed as an exponentially decayed event function and a decay parameter controls a rate at which contribution of historical events to the numerical aggregate value decays as time passes;
   detecting an event occurring over the network and associated with the observed value of the categorical variable;
   extracting features from the event, wherein the features comprise an encoded feature based on the numerical aggregate value to represent the observed value of the categorical variable;
   applying a predictive model, the predictive model having been trained on at least the numerical aggregate value, to the features to determine a score representing likelihood of an outcome for the event; and
   based on the score, controlling access to a resource of the network.

2. The method of claim 1, wherein the numerical aggregate value is an exponentially smoothed total count aggregate representing a count of the observed value in certain events occurring over the network.

3. The method of claim 2, further comprising updating an exponentially smoothed positive count aggregate representing an additional count of the observed value in events of the certain events that led to the outcome of interest.

4. The method of claim 3, wherein the encoded feature is a function of the exponentially smoothed total count aggregate and the exponentially smoothed positive count aggregate.

5. The method of claim 3, further comprising computing the encoded feature,
   wherein computing the encoded feature comprises:
   updating the exponentially smoothed total count aggregate based on a time of the event;
   updating the exponentially smoothed positive count aggregate based on the time of the event; and
   computing the encoded feature as a function of the updated exponentially smoothed total count aggregate and the updated exponentially smoothed positive count aggregate.

6. The method of claim 1, further comprising:
   detecting additional historical events occurring over the network, wherein at least one of the additional historical events is associated with a second observed value of the categorical variable;
   determining that the second observed value is not yet represented in a data store;
   adding, to the data store, a categorical key corresponding to the second observed value; and
   assigning a second numerical aggregate value to represent the second observed value of the categorical variable based on a count of the historical events associated with the second observed value.

7. The method of claim 1, wherein the numerical aggregate value is computed as a function of appearance of the observed value in past events, wherein a first weight given to a first event occurring after a second event is greater than a second weight given to the second event in the function.

8. The method of claim 1, wherein the encoded feature is computed as a function of appearance of the observed value in past events, wherein a first weight given to a first event occurring after a second event is greater than a second weight given to the second event in the function.

9. A system comprising:
a processor; and
a non-transitory computer-readable medium comprising instructions that are executable by the processor for causing the processor to perform operations comprising:
detecting historical events occurring over a network, wherein at least one of the historical events is associated with an observed value of a categorical variable;
updating, through a recursive technique, a numerical aggregate value representing the observed value of the categorical variable, on both (i) an exponentially smoothed prior numerical aggregate value representing prior historical events associated with the observed value and (ii) an exponentially smoothed positive count aggregate representing a number of times the historical events associated with the observed value led to an outcome of interest, wherein the numerical aggregate value is computable as an exponentially decayed event function and a decay parameter controls a rate at which contribution of historical events to the numerical aggregate value decays as time passes;
detecting an event occurring over the network and associated with the observed value of the categorical variable;
extracting features from the event, wherein the features comprise an encoded feature based on the numerical aggregate value to represent the observed value of the categorical variable;
applying a predictive model, the predictive model having been trained on at least the numerical aggregate value, to the features to determine a score representing likelihood of an outcome for the event; and
based on the score, controlling access to a resource of the network.

10. The system of claim 9, wherein the numerical aggregate value is an exponentially smoothed total count aggregate representing a count of the observed value in certain events occurring over the network.

11. The system of claim 10, wherein an aggregation subsystem is configured to update an exponentially smoothed positive count aggregate representing an additional count of the observed value in events of the certain events that led to the outcome of interest.

12. The system of claim 11, wherein the encoded feature is a function of the exponentially smoothed total count aggregate and the exponentially smoothed positive count aggregate.

13. The system of claim 11, wherein the operations further comprise:
computing the encoded feature, wherein computing the encoded feature comprises:
updating the exponentially smoothed total count aggregate based on a time of the event;
updating the exponentially smoothed positive count aggregate based on the time of the event; and
computing the encoded feature as a function of the updated exponentially smoothed total count aggregate and the updated exponentially smoothed positive count aggregate.

14. The system of claim 9, wherein the operations further comprise:
detecting additional historical events occurring over the network, wherein at least one of the additional historical events is associated with a second observed value of the categorical variable;
determining that the second observed value is not yet represented in a data store;
adding, to the data store, a categorical key corresponding to the second observed value; and
assigning a second numerical aggregate value to represent the second observed value of the categorical variable based on a count of the historical events associated with the second observed value.

15. A non-transitory computer-readable storage medium having program code that is executable by a processor device to cause the processing device to perform operations comprising:
detecting historical events occurring over a network, wherein at least one of the historical events is associated with an observed value of a categorical variable;
updating, through a recursive technique, a numerical aggregate value representing the observed value of the categorical variable, on both (i) an exponentially smoothed prior numerical aggregate value representing prior historical events associated with the observed value and (ii) an exponentially smoothed positive count aggregate representing a number of times the historical events associated with the observed value led to an outcome of interest, wherein the numerical aggregate value is computable as an exponentially decayed event function and a decay parameter controls a rate at which contribution of historical events to the numerical aggregate value decays as time passes;
detecting an event occurring over the network and associated with the observed value of the categorical variable;
extracting features from the event, wherein the features comprise an encoded feature based on the numerical aggregate value to represent the observed value of the categorical variable;
applying a predictive model, the predictive model having been trained on at least the numerical aggregate value, to the features to determine a score representing likelihood of an outcome for the event; and
based on the score, controlling access to a resource of the network.

16. The non-transitory computer-readable storage medium of claim 15, wherein the numerical aggregate value is an exponentially smoothed total count aggregate representing a count of the observed value in certain events occurring over the network.

17. The non-transitory computer-readable storage medium of claim 16, the operations further comprising updating an exponentially smoothed positive count aggregate representing an additional count of the observed value in events of the certain events that led to the outcome of interest.

18. The non-transitory computer-readable storage medium of claim 17, wherein the encoded feature is a function of the exponentially smoothed total count aggregate and the exponentially smoothed positive count aggregate.

19. The non-transitory computer-readable storage medium of claim 17, the operations further comprising computing the encoded feature, wherein computing the encoded feature comprises:
- updating the exponentially smoothed total count aggregate based on a time of the event;
- updating the exponentially smoothed positive count aggregate based on the time of the event; and
- computing the encoded feature as a function of the updated exponentially smoothed total count aggregate and the updated exponentially smoothed positive count aggregate.

20. The non-transitory computer-readable storage medium of claim 15, the operations further comprising:
- detecting additional historical events occurring over the network, wherein at least one of the additional historical events is associated with a second observed value of the categorical variable; and
- determining that the second observed value is not yet represented in a data store;
- adding, to the data store, a categorical key corresponding to the second observed value; and
- assigning a second numerical aggregate value to represent the second observed value of the categorical variable based on a count of the historical events associated with the second observed value.

* * * * *